(12) United States Patent
Matsumoto

(10) Patent No.: US 11,083,310 B2
(45) Date of Patent: Aug. 10, 2021

(54) REASSEMBLABLE CRIB

(71) Applicant: Grandoir International Ltd., Nagakute (JP)

(72) Inventor: Junya Matsumoto, Nagakute (JP)

(73) Assignee: Grandoir International Ltd., Nagakute (JP)

( * ) Notice: Subject to any disclaimer, the term of this patent is extended or adjusted under 35 U.S.C. 154(b) by 365 days.

(21) Appl. No.: 16/134,249

(22) Filed: Sep. 18, 2018

(65) Prior Publication Data

US 2019/0014919 A1   Jan. 17, 2019

Related U.S. Application Data

(63) Continuation of application No. PCT/JP2016/059170, filed on Mar. 23, 2016.

(51) Int. Cl.
| | |
|---|---|
| *A47D 9/00* | (2006.01) |
| *A47D 5/00* | (2006.01) |
| *A47D 3/00* | (2006.01) |
| *A47D 11/00* | (2006.01) |
| *A47D 13/06* | (2006.01) |
| *B60B 33/00* | (2006.01) |

(52) U.S. Cl.
CPC ............... *A47D 9/00* (2013.01); *A47D 3/00* (2013.01); *A47D 5/00* (2013.01); *A47D 11/00* (2013.01); *A47D 13/066* (2013.01); *B60B 33/0002* (2013.01); *B60B 33/0005* (2013.01)

(58) Field of Classification Search
CPC .. A47D 143/066; A47C 19/005; A47C 19/02; A47C 17/645; A47C 17/795; A47C 4/02
See application file for complete search history.

(56) References Cited

U.S. PATENT DOCUMENTS

| | | | | |
|---|---|---|---|---|
| 3,745,596 A | * | 7/1973 | Copeland | A47C 17/86 5/308 |
| 5,394,574 A | * | 3/1995 | Chuang | A47D 7/002 5/11 |
| 2014/0115779 A1 | | 5/2014 | Lawlor et al. | |

FOREIGN PATENT DOCUMENTS

| | | |
|---|---|---|
| JP | H06-052630 U | 7/1994 |
| JP | 3019444 U | 12/1995 |
| JP | H07-327745 A1 | 12/1995 |
| JP | H08-242979 A1 | 9/1996 |
| JP | H09-206179 A1 | 8/1997 |
| JP | H11-009402 A1 | 1/1999 |
| JP | H11-042148 A1 | 2/1999 |
| JP | 2002-159380 A1 | 6/2002 |

(Continued)

OTHER PUBLICATIONS

Extended European Search Report (Application No. 16895366.9) dated Jul. 9, 2019.

(Continued)

*Primary Examiner* — David R Hare
*Assistant Examiner* — Adam C Ortiz
(74) *Attorney, Agent, or Firm* — Burr & Brown, PLLC

(57) ABSTRACT

A reassemblable crib includes an assembly type baby fence, a bed board, casters, and foot members. The bed board is installed in a predetermined manner in the baby fence. The casters are mounted to a bottom of the baby fence. The foot members are removably mounted to the bottom of the baby fence. The casters are removably mounted to bottoms of the foot members or the bottom of the baby fence.

3 Claims, 12 Drawing Sheets

(56) References Cited

FOREIGN PATENT DOCUMENTS

| | | |
|---|---|---|
| JP | 2004-033462 A1 | 2/2004 |
| JP | 2004-089682 A1 | 3/2004 |
| JP | 2004-337409 A1 | 12/2004 |
| JP | 2014-087457 A1 | 5/2014 |
| JP | 2015-159963 A1 | 9/2015 |

OTHER PUBLICATIONS

International Search Report and Written Opinion (Application No. PCT/JP2016/059170) dated May 17, 2016.

* cited by examiner

[FIG.1]
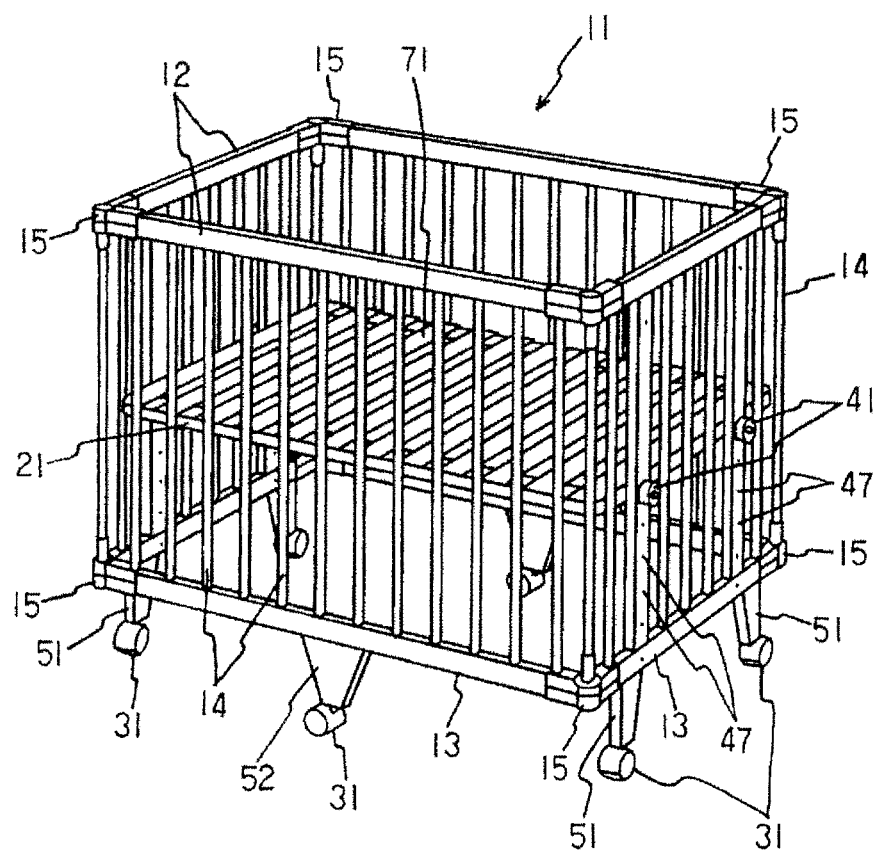

[FIG.2]
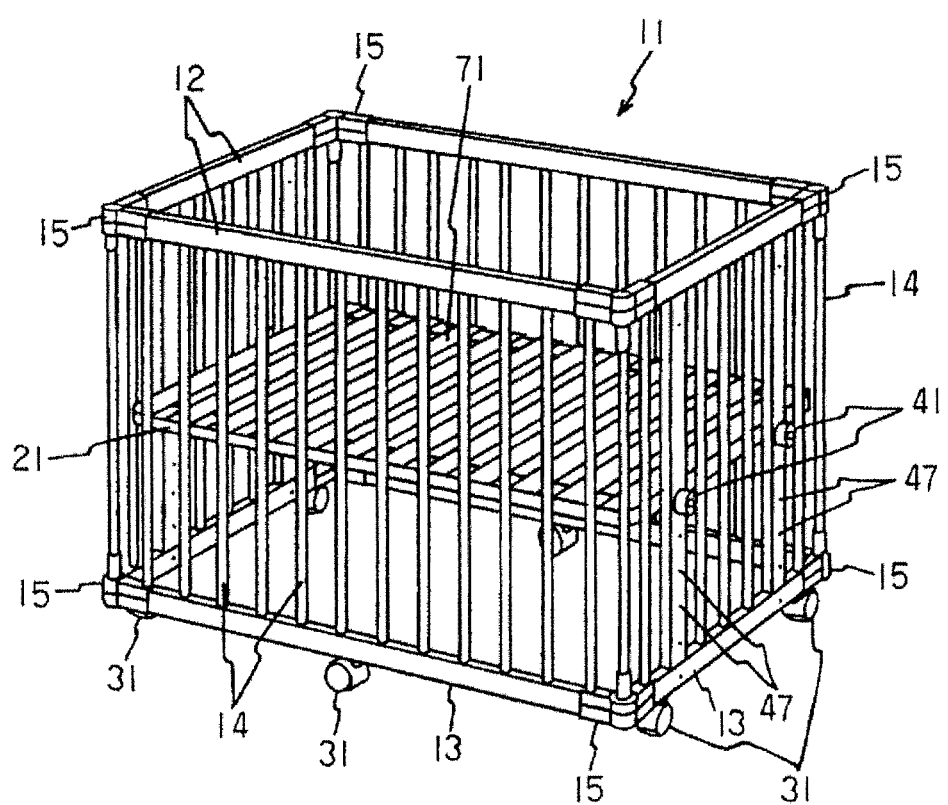

[FIG.3]
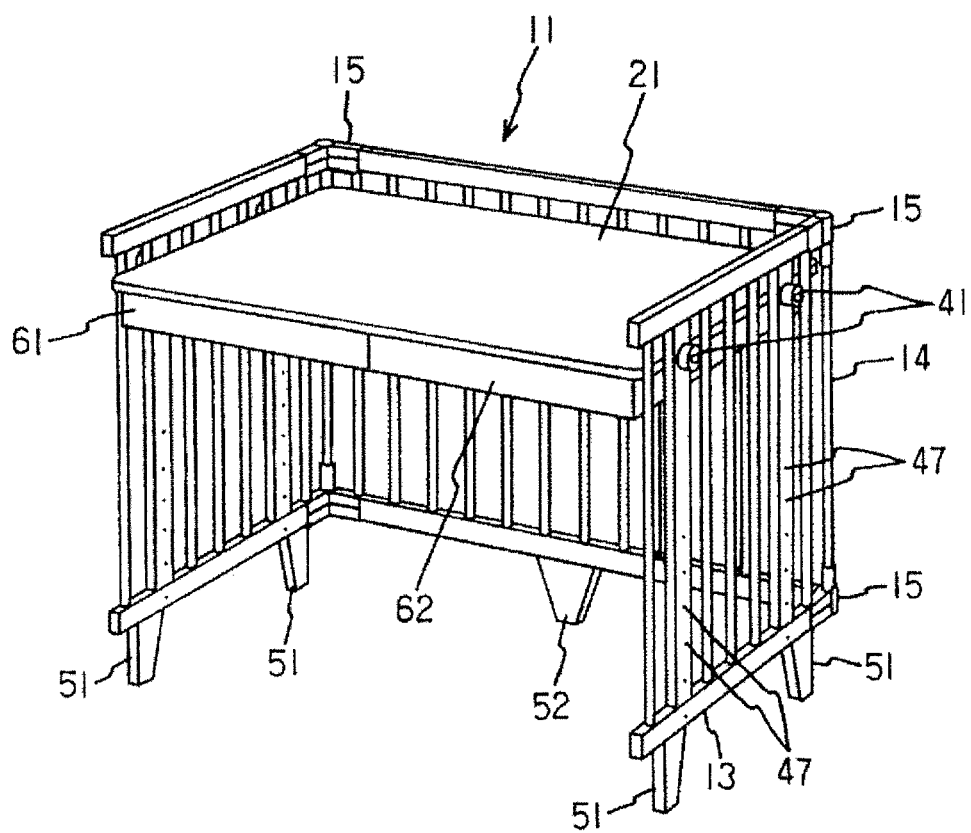

[FIG.4]
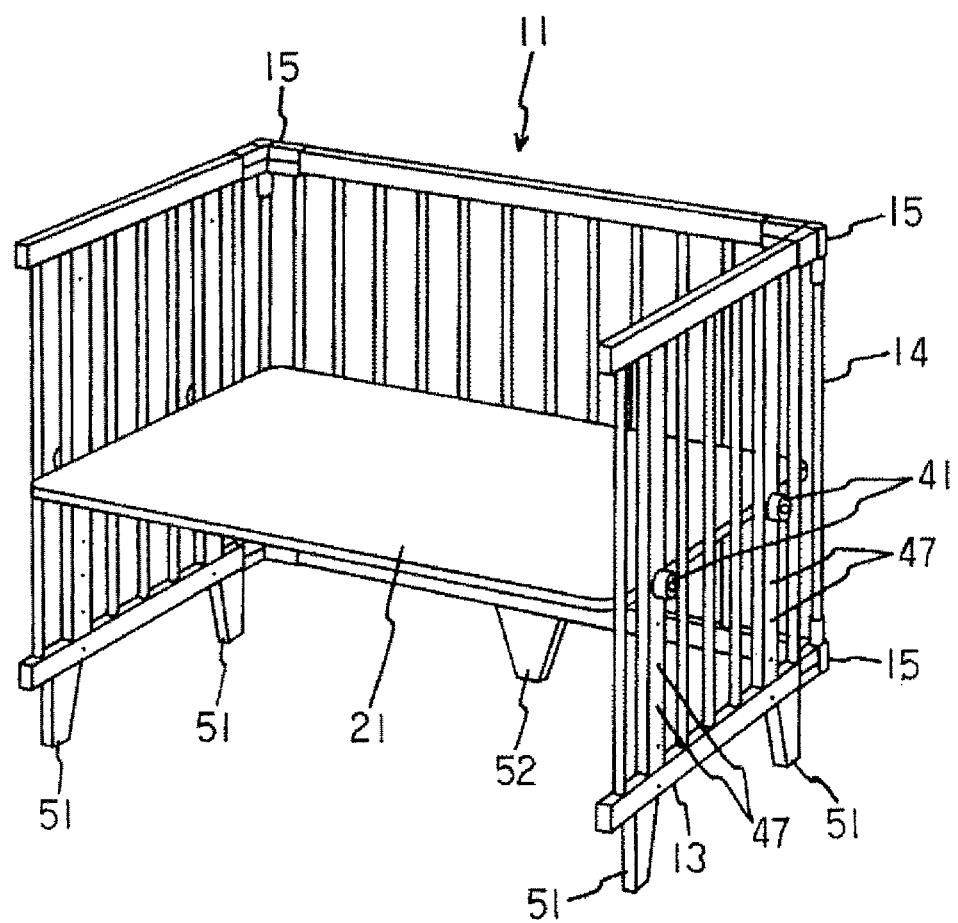

[FIG.5]
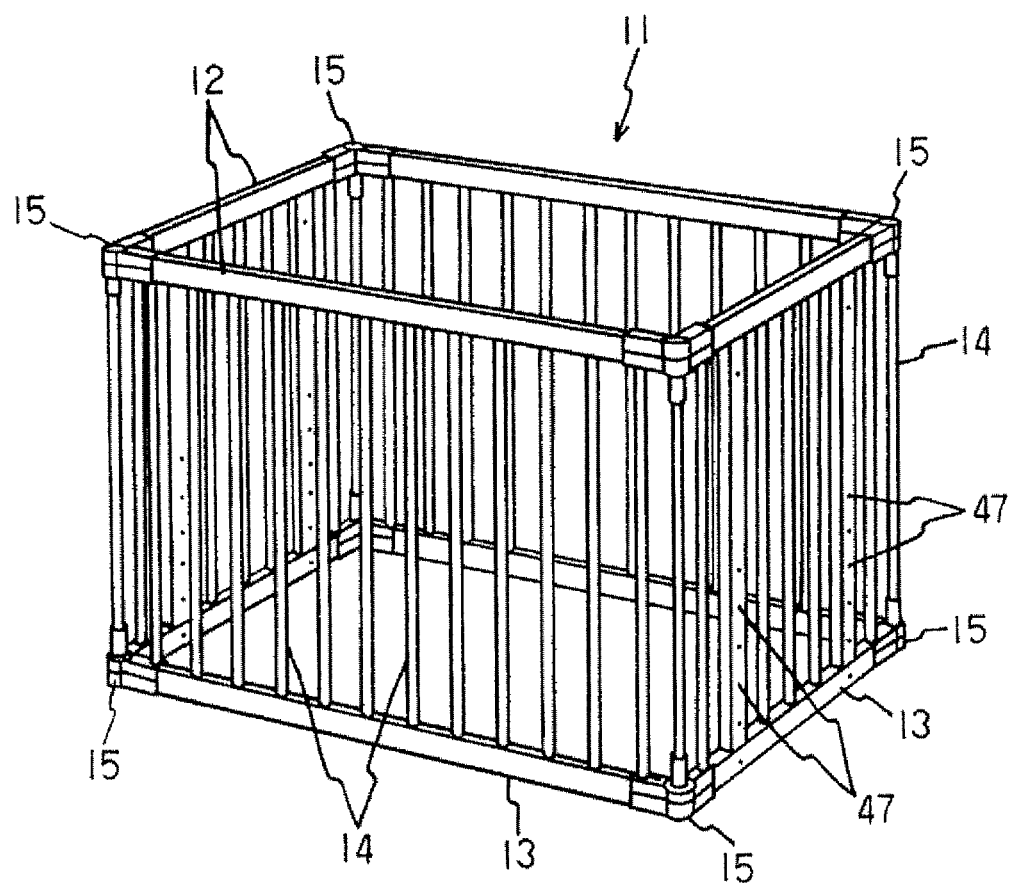

[FIG.6]
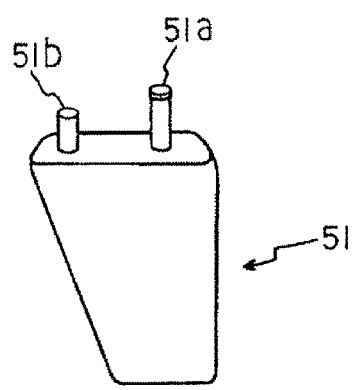

[FIG.7]
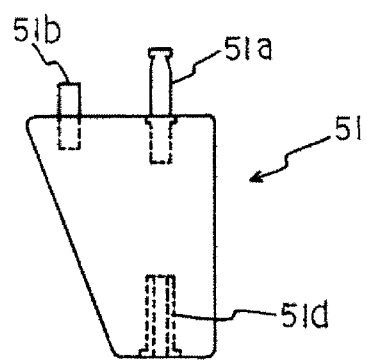

[FIG.8]
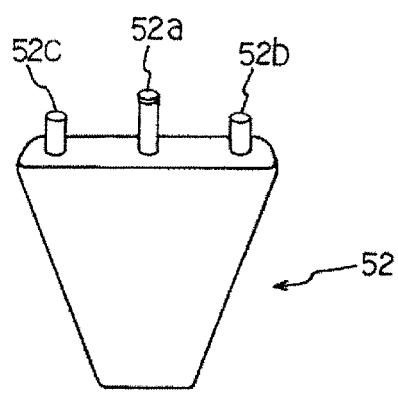

[FIG.9]
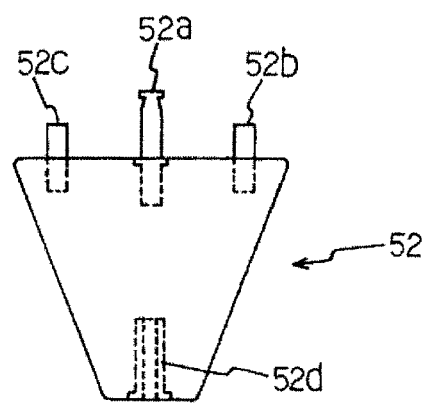

[FIG.10]
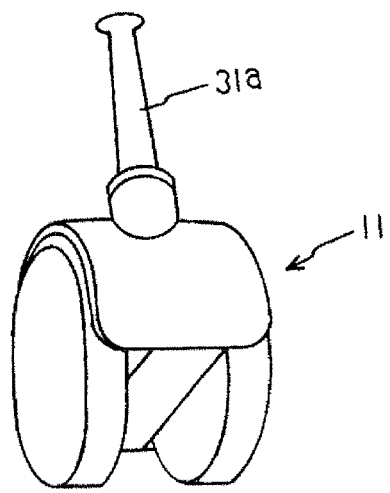

[FIG.11]
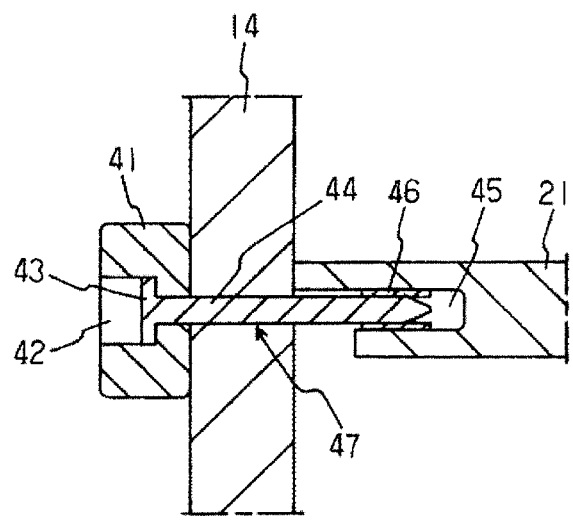

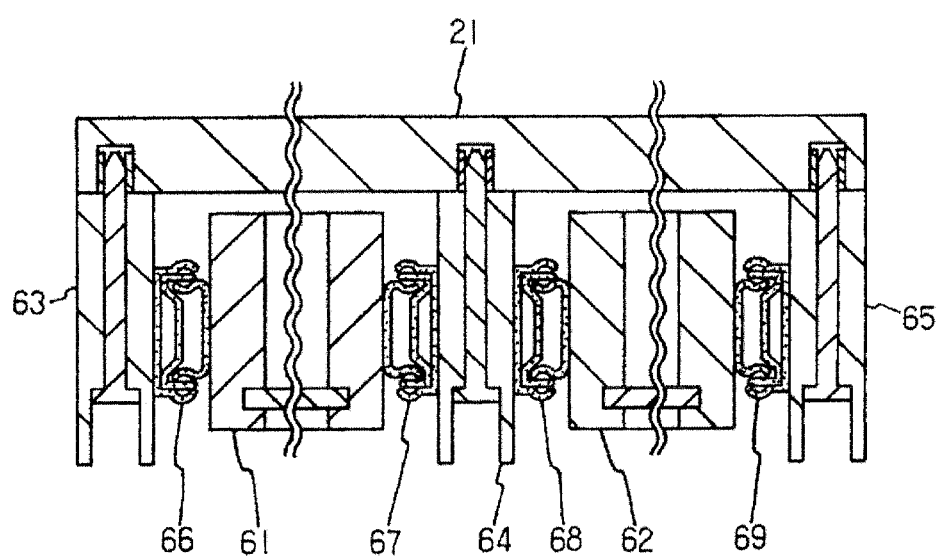
[FIG.12]

REASSEMBLABLE CRIB

BACKGROUND OF THE INVENTION

This application is a Continuation of International Application No. PCT/JP2016/059170 filed on Mar. 23, 2016, the disclosures of which are incorporated by reference herein in their entireties.

Field of the Invention

The disclosure relates to a reassemblable crib and in detail relates to a crib that is reassembled and can be used not only as a crib such as a high crib (crib having a high height) and a low crib (crib having a low height) but also as, for example, an adult desk, a child desk, a bench, a sofa, and further a baby fence (baby circle, playpen) through a simple work.

Related Art

There has been conventionally known various reassemblable cribs, as shown in Japanese Laid-Open Patent Publication No. 8-242979, Japanese Laid-Open Patent Publication No. 11-9402, Japanese Laid-Open Patent Publication No. 11-42148, Japanese Laid-Open Patent Publication No. 2002-159380, Japanese Laid-Open Patent Publication No. 2004-33462, and Japanese Laid-Open Patent Publication No. 2015-159963, for example. These reassemblable cribs include an assembly type baby fence, a bed board installed in a predetermined manner in this baby fence, and casters mounted to a bottom of this baby fence; and can be used as, for example, a child bed, a mini-desk, a bench, and a baby circle in addition to the crib through reassembly.

These conventional reassemblable cribs are configured to be reassembled for use but actually have a problem of poor usability. The conventional reassemblable cribs are almost impossible to adjust their heights from their installation surface to the top of the baby fence, thereby causing difficulty in use after reassembly into various configurations, such as a high crib, a low crib, an adult desk, a child desk, a bench, a sofa, and a baby circle. For example, in the use as the crib, some extent of height is required from the bed board to the top of the baby fence for safety, and additionally, the positions of the bed board serving as a board of the desk are considerably different between the use as the child desk and the use as the adult desk. Therefore, as the baby fence to which the bed board is installed in a predetermined manner at the positions, the baby fence having a correspondingly high height is used; however, when the bed board is removed and the baby fence is attempted to be used as the baby circle, because of the excessive height, works of holding a baby and putting him/her into the baby circle over the baby fence and taking the baby out of the baby circle are extremely troublesome.

The problem to be solved by the disclosure is to provide a reassemblable crib of practically good usability.

SUMMARY OF THE INVENTION

The disclosure to solve the above-described problem provides a reassemblable crib that includes an assembly type baby fence, a bed board, casters, and foot members. The bed board is installed in a predetermined manner in the baby fence. The casters are mounted to a bottom of the baby fence. The foot members are removably mounted to the bottom of the baby fence. The casters are removably mounted to bottoms of the foot members or the bottom of the baby fence.

The reassemblable crib according to the disclosure includes the assembly type baby fence, the bed board installed in the predetermined manner in the baby fence, and the casters mounted to the bottom of the baby fence. The baby fence is the assembly type usually assembled into a rectangular when viewed in the plane that includes upper and lower horizontal frames, a plurality of vertical frames bridged between the upper and lower horizontal frames at predetermined intervals, and joints that couple the mutual horizontal frames together. The baby fence itself has a configuration similar to that of the conventional reassemblable crib.

The bed board is installed in the predetermined manner in the baby fence. The bed board usually has a rectangular flat board shape when viewed in the plane and is installed in a predetermined manner to the vertical frames of the baby fence at ends of the short sides. While any installation means, such as placing means, hooking means, fitting means, and screwing means on stopper members mounted to the vertical frames of the baby fence are usable, the screwing means is preferred. Among the screwing means, the following means is preferred. Bolts whose heads are fixed to depressed portions disposed at knobs and nuts fixed to depressed portions disposed at ends of short sides of the bed board are provided. The bolts have tops screwed and fastened with the nuts through holes bored at predetermined intervals vertically on the vertical frames of the baby fence to install the bed board to the baby fence in a predetermined manner.

The reassemblable crib according to the disclosure includes the casters and the foot members in addition to the above-described baby fence and bed board. Usually, while the foot members are removably mounted to the bottoms of the horizontal frames on the lower side of the baby fence and usually the casters are removably mounted to the bottoms of the foot members, when the foot members are removed, the casters are configured to be removably mounted to the bottoms of the horizontal frames on the lower side of the baby fence similarly to the above-described case of the foot members.

Any mounting means of the foot members and the casters are usable such as means that clamps the foot members and the casters to the bottoms of the horizontal frames on the lower side of the baby fence, means that screws the insertion members projected from the foot members and the casters to the depressed portions disposed at the bottoms of the horizontal frames on the lower side of the baby fence, and insertion means. However, the insertion means is preferred for convenience of work. Among the insertion means, the following means is preferred. Main insertion members for mounting are projected at tops of the foot members and tops of the casters. Further sub-insertion members for positioning are projected at tops of the foot members. The main insertion members and the sub-insertion members on the foot members are configured to be inserted into hole portions. The hole portions are formed at bottoms of the horizontal frames on the lower side of the baby fence. The main insertion members on the casters are configured to be inserted into hole portions. The hole portions are formed at the bottoms of the foot members. Similarly to the above-described case of the foot members, the main insertion members are also configured to be inserted into the hole portions formed at the bottoms of the horizontal frames on the lower side of the baby fence.

With the reassemblable crib according to the disclosure including the removable foot members and the removable casters, the height is adjustable from the installation surface to the top of the baby fence by the height of the foot members, the height of the casters, or further the heights of the foot members and the casters. This configuration does not cause any difficulty in reassembling the reassemblable crib into various configurations such as a high crib, a low crib, an adult desk, a child desk, a bench, a sofa, and a baby circle for use. The reassemblable crib according to the disclosure features practically good usability exceedingly.

As described above, while the reassemblable crib according to the disclosure includes the baby fence, the bed board, the foot members, and the casters, additionally providing wooden slats is preferred. The wooden slats are configured to be placed on the bed board. When a mattress and a cushion material are placed on the wooden slats for use as the crib, air permeability is obtained by the wooden slats and therefore the mattress and the cushion material do not become sweaty.

A drawing is preferably mounted to a lower surface of the bed board. For example, supporting members are disposed from both ends and the center of the lower surface of the bed board along the short sides, and the drawers are mounted so as to be sandwiched between these supporting members via slide rails. Such drawer is convenience for housing various small articles.

A reassemblable crib of the disclosure has an effect of practically good usability exceedingly when reassembled into various configurations such as a high crib, a low crib, an adult desk, a child desk, a bench, a sofa, and a baby circle for use.

BRIEF DESCRIPTION OF THE DRAWINGS

FIG. 1 is a perspective view illustrating a reassemblable crib (high crib) according to the disclosure as an example.

FIG. 2 is a perspective view illustrating a state where the crib (high crib) of FIG. 1 has been reassembled into another configuration (low crib).

FIG. 3 is a perspective view illustrating a state where the crib (high crib) of FIG. 1 has been reassembled into another configuration (adult desk).

FIG. 4 is a perspective view illustrating a state where the crib (high crib) of FIG. 1 has been reassembled into another configuration (child desk).

FIG. 5 is a perspective view illustrating a state where the crib (high crib) of FIG. 1 has been reassembled into another configuration (baby circle).

FIG. 6 is a perspective view illustrating a foot member at a corner of the crib in FIG. 1.

FIG. 7 is a side view illustrating the foot member of FIG. 6.

FIG. 8 is a perspective view illustrating the foot member at an intermediate portion of the crib of FIG. 1.

FIG. 9 is a side view illustrating the foot member of FIG. 8.

FIG. 10 is a perspective view illustrating a caster of the crib of FIG. 1.

FIG. 11 is a partially enlarged vertical cross-sectional view illustrating a mounting state of a bed board to a baby fence in the crib of FIG. 1.

FIG. 12 is a partially enlarged vertical cross-sectional view illustrating a mounting state of a drawer to the bed board in the crib of FIG. 1.

DETAILED DESCRIPTION OF THE INVENTION

A reassemblable crib (high crib) illustrated in FIG. 1 as an example includes an assembly type baby fence 11, a bed board 21 installed in a predetermined manner in the baby fence 11, and casters 31 mounted to the bottom of the baby fence 11. The assemble type baby fence 11 is assembled into a rectangular when viewed in the plane that includes upper and lower horizontal frames 12, 13, a plurality of vertical frames 14 bridged between the upper and lower horizontal frames 12, 13 at predetermined intervals, and joints 15 that couple the mutual horizontal frames 12, 12 on the upper side together and the mutual horizontal frames 13, 13 on the lower side together. The baby fence 11 itself has a configuration similar to that of the conventional reassemblable crib.

In the high crib of FIG. 1, the bed board 21 is installed in a predetermined manner in the baby fence 11. The bed board 21 has a rectangular flat board shape when viewed in the plane and is installed in a predetermined manner to the vertical frames 14 of the baby fence 11 at ends of the short sides. More specifically, as illustrated in FIG. 11, a bolt 44 whose head 43 is fixed to a depressed portion 42 disposed at a knob 41 and a nut 46 fixed to a depressed portion 45 disposed at the end of the short side of the bed board 21 are used. The tops of the bolts 44 are screwed and fastened with the nuts 46 through holes 47 bored at predetermined intervals vertically on the vertical frames 14 of the baby fence to install the bed board 21 to the baby fence 11.

The high crib of FIG. 1 includes the caster 31 and foot members 51, 52 in addition to the baby fence 11 and the bed board 21. In the high crib of FIG. 1, the foot members 51 at the corners and the foot member 52 at the intermediate portion are removably mounted to the bottom of the horizontal frames 13 on the lower side of the baby fence 11, and the casters 31 are removably mounted to the bottoms of the foot members 51, 52. Specifically, as illustrated in FIG. 6 to FIG. 10, main insertion members 51a, 52a, 31a for mounting are projected at the tops of the foot members 51, 52 and the tops of the casters 31, and further sub-insertion members 51b, 52b, 52c for positioning are projected at the tops of the foot members 51, 52. The main insertion members 51a, 52a and the sub-insertion members 51b, 52b, 52c on the foot members 51, 52 are inserted into hole portions (not illustrated) formed at the bottom of the horizontal frame 13 on the lower side of the baby fence 11. The main insertion members 31a of the casters 31 are configured to be inserted into hole portions 51d, 52d formed at the bottoms of the foot members 51, 52, and are configured to be inserted into the hole portions (not illustrated) formed on the bottoms of the horizontal frames 13 on the lower side of the baby fence similarly to the case of the foot members 51, 52.

FIG. 2 illustrates a low crib in a state where the foot members 51, 52 have been removed from the high crib of FIG. 1. The low crib of FIG. 2 is a low crib having a height lower than that of the high crib of FIG. 1 by an amount of the removed foot members 51, 52. Reference numerals identical to those of FIG. 1 are used except for the foot members 51, 52; therefore, the further descriptions are omitted.

FIG. 3 illustrates an adult desk in a state where, while the front surface of the baby fence 11 and the casters 31 are removed from the high crib of FIG. 1, the position where the bed board 21 is installed in the predetermined manner is moved upward and drawers 61, 62 are mounted to the lower surface of the bed board 21. Since the adult desk of FIG. 3 is configured by removing the casters 31 from the high crib of FIG. 1, the installation state stabilizes. Additionally, the bed board 21 used as a desk board is installed in the predetermined manner at the upper portion of the baby fence 11, and the drawers 61, 62 are mounted to the lower surface of the bed board 21, and the adult desk features good usability. Since reference numerals identical to those of FIG. 1 are used except for the caster 31, the further descriptions are omitted, though, as illustrated in FIG. 12, supporting members 63, 64, 65 suspend from both ends and the center of the lower surface of the bed board 21 along the short sides, and the drawers 61, 62 are mounted so as to be sandwiched between these supporting members 63, 64, 65 via slide rails 66 to 69.

FIG. 4 illustrates a child desk in a state where the front surface of the baby fence 11 and the casters 31 are removed from the high crib of FIG. 1. Since the child desk of FIG. 4 is configured by removing the casters 31 from the high crib of FIG. 1, the installation state stabilizes and the child desk features good usability. Since reference numerals and the like identical to those of FIG. 1 are used except for the caster 31, the further descriptions are omitted, though, the child desk of FIG. 4 is also usable as a bench without change and placing a cushion material on the bed board 21 also allows using the child desk as a sofa.

FIG. 5 illustrates the baby fence 11 (baby circle) in a state where the bed board 21, the foot members 51, 52, and the castes 13 are removed from the high crib of FIG. 1. The baby circle of FIG. 5 is a baby circle having a height lower than that of the high crib of FIG. 1 by the amount of the removed foot members 51, 52 and casters 31, thereby featuring good usability. Reference numerals identical to those of FIG. 1 are used except for the bed board 21, the foot members 51, 52, and the caster 31; therefore, the further descriptions are omitted.

Although the description is omitted, wooden slats 71 are placed on the bed board 21 of the high crib of FIG. 1 and the low crib of FIG. 2. When a mattress and a cushion material are placed on the wooden slats 71 for use as the crib, air permeability is obtained and therefore the crib features good usability.

The illustrated reassemblable crib features practically good usability exceedingly when reassembled into various configurations such as a high crib, a low crib, an adult desk, a child desk, a bench, a sofa, and a baby circle for use.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A reassemblable crib comprising:
   an assembled baby fence;
   a bed board installed in a predetermined manner in the baby fence;
   a plurality of knobs having a circular cross-sectional shape and a central bore passing therethrough and defining a depressed portion, a plurality of bolts whose heads are fixedly recessed in the depressed portions of the respective plurality of knobs, and a plurality of nuts fixed to shaft portions of the bolts and which are disposed at ends of the bed board, wherein the bolts have tops screwed and fastened with the nuts through holes bored at predetermined intervals vertically on the baby fence to install the bed board to the baby fence in a predetermined manner;
   casters mounted to a bottom of the baby fence; and
   foot members,
   wherein the foot members are removably mounted to the bottom of the baby fence, and wherein the casters being removably mounted to bottoms of the foot members or the bottom of the baby fence, and
   wherein main insertion members for mounting are projected at tops of the foot members and tops of the casters, further sub-insertion members for positioning are projected at tops of the foot members, the main insertion members and the sub-insertion members on the foot members are configured to be inserted into hole portions, the hole portions are formed at the bottom of the baby fence, the main insertion members on the casters are configured to be inserted into hole-portions, and the hole-portions are formed at the bottoms of the foot members or the bottom of the baby fence.

2. The reassemblable crib according to claim 1, further comprising wooden slats placed on the bed board.

3. The reassemblable crib according to claim 1, further comprising a drawer mounted to a lower surface of the bed board.

* * * * *